United States Patent
Mohagheghi et al.

(10) Patent No.: US 6,262,420 B1
(45) Date of Patent: Jul. 17, 2001

(54) DETECTION OF ALPHA RADIATION IN A BETA RADIATION FIELD

(75) Inventors: Amir H. Mohagheghi, Albuquerque; Robert P. Reese, Edgewood, both of NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/293,731

(22) Filed: Apr. 16, 1999

(51) Int. Cl.$^7$ ....................................................... G01T 1/22
(52) U.S. Cl. .................. 250/370.02; 250/492.21; 250/398
(58) Field of Search ................... 250/370.02, 492.21, 250/398

(56) References Cited

U.S. PATENT DOCUMENTS

| | | |
|---|---|---|
| 4,104,523 | 8/1978 | Wolfert . |
| 4,172,225 | * 10/1979 | Woldseth et al. ............... 250/370.02 |
| 4,835,107 | 5/1989 | Horwitz et al. . |
| 5,190,881 | 3/1993 | McKibbin . |
| 5,311,028 | * 5/1994 | Glavish ........................... 250/492.21 |
| 5,489,780 | 2/1996 | Diamondis . |

OTHER PUBLICATIONS

Kleinknecht, K., Detectors for Particle Radiation, 1998, Cambridge University Press, pp. 50–55).
Mohagheghi, A., Ghanbari, F., Ebara, S., Enghauser, M. and Bakhtiar, S., "Direct Analyses of Air Filter Samples for Alpha Emitting Isotopes," J. of Radioanalytical and Nuclear Chemistry, 1998, vol. 234, No. 1–2, 261–266.

* cited by examiner

Primary Examiner—Constantine Hannaher
Assistant Examiner—Andrew Israel
(74) Attorney, Agent, or Firm—Elmer A. Klavetter

(57) ABSTRACT

An apparatus and method for detecting alpha particles in the presence of high activities of beta particles utilizing an alpha spectrometer. The apparatus of the present invention utilizes a magnetic field applied around the sample in an alpha spectrometer to deflect the beta particles from the sample prior to reaching the detector, thus permitting detection of low concentrations of alpha particles. In the method of the invention, the strength of magnetic field required to adequately deflect the beta particles and permit alpha particle detection is given by an algorithm that controls the field strength as a function of sample beta energy and the distance of the sample to the detector.

6 Claims, 5 Drawing Sheets

DETECTION OF ALPHA RADIATION IN A BETA RADIATION FIELD

This invention was made with Government support under Contract No. DE-AC04-94AL85000 awarded by the United States Department of Energy. The Government has certain rights in the invention.

BACKGROUND OF THE INVENTION

The present application is generally directed to a method and apparatus for detecting alpha radiation in the presence of beta radiation and more particularly to a method and apparatus utilizing alpha spectroscopy for detecting alpha radiation in the presence of beta radiation.

Some separation operations require the detection of very low levels of alpha radiation in presence of very large amounts of beta radiation in a short time, preferably without generating hazardous wastes. An example includes the production of an isotope of molybdenum, Mo-99, for medical use. One decay product of Mo-99, technetium-99 (Tc-99), is used on patients in the U.S. thousands of times a day to conduct imaging of major organs for diagnosis of many conditions, including blockages and poorly functioning organs, thereby replacing invasive surgery as a means of detection. Because of its use within the human body, Mo-99 has to be very pure, requiring that the alpha contamination to Mo-99 activity ratio be less than $1 \times 10^{-10}$.

Verification of the purity of Mo-99 presently comes through the chemical analysis of the solution containing the isotope. However, this method is time consuming, and produces an array of chemical wastes, which in turn have to be analyzed and disposed of properly, requiring additional time and resources.

Two basic approaches are presently utilized in the detection of alpha contamination in a sample. The first technique employs radiochemistry to separate and isolate a particular radioactive element. The sample is digested in an acidic solution and run through an ion-exchange column to separate the element of interest. The resulting solution is mounted on a filter and analyzed by an alpha spectrometer to identify and quantify the alpha-emitting radioisotopes. McKibbin (U.S. Pat. No. 5,190,881, issued on Mar. 2, 1993) describes a method of determining the radioactivity of uranium, plutonium, and americium in urine and fecal samples by this technique. Horwitz et al. (U.S. Pat. No. 4,835,107, issued on May 30, 1989) also describe a method and apparatus using this general technique for the quantitative recovery of actinide values from biological samples such as urine, blood and feces and from environmental samples such as soil and water. One significant problem with this technique is that it generates a significant amount of hazardous waste mixed with radioactive materials and is time-consuming and labor intensive.

The second method is used mostly for air filter samples where they are counted directly by a gas proportional detector. The properties of the detector are used to label the alpha and beta particles. Manipulating the high voltage on the detector that effects the pulse height of the incident radiation separates the alpha pulses from beta pulses. However, even under the ideal conditions, there is a small cross talk (mislabeling) from the beta into the alpha channel. In cases where the beta activity is very large, this produces a false positive signal for the alpha radiation. For activity levels above $1 \times 10^6$ disintegrations per minute, the detector system becomes saturated (Kleinknecht, K., Detectors for Particle Radiation, 1998, Cambridge University Press, pp. 50–55).

Diamondis (U.S. Pat. No. 5,489,780, issued on Feb. 6, 1996) provides an example of a radon gas detector that employs a photovoltaic alpha particle detecting photodiode disposed within a radon gas detection chamber. Mohagheghi et al. (Mohagheghi, A., Ghanbari, F., Ebara, S., Enghauser, M. and Bakhtiar, S., J. of Radioanalytical and Nuclear Chemistry, 1998, Vol. 234, Nos. 1–2, 261–266) also describe a method of detecting alpha-emitting isotopes from air filters utilizing an alpha spectrometer. Mohagheghi et al. utilize a mathematical function to estimate the activity of each isotope and therefore support detection of the alpha particles. The method does not address detection of alpha particles in a beta field of radiation.

The problem of detecting low concentrations of alpha particles in a beta radiation field without generating additional hazardous wastes are solved by the apparatus and method discussed here. An alpha spectrometer is equipped with means for generating a magnetic field and a controller to control the ratio of beta and alpha particles that enter the detector of the alpha spectrometer. By proper control of the strength of the magnetic field applied around the alpha spectrometer, alpha particles can be detected from samples with alpha to beta particle activity ratios much less than $1 \times 10^{-6}$.

SUMMARY OF THE INVENTION

According to the present invention, an apparatus for detecting alpha particles in the presence of beta particles is provided, comprising an alpha spectrometer, means for generating a magnetic field within the vacuum chamber of the alpha spectrometer; a magnet yoke to constrain the magnetic field; and means for controlling the strength of the generated magnetic field. The means for generating a magnetic field is preferably a Helmholtz coil.

According to the present invention, a method for detecting alpha particles in the presence of beta particles is also provided, comprising of placing a sample in an alpha spectrometer; applying a magnetic field around the alpha spectrometer, said magnet field produced by Helmholtz coils surrounding the alpha spectrometer and constrained by an iron magnet yoke; and detecting alpha particles from the sample. The applied magnetic field is preferably within the range of 500 Gauss to 8000 Gauss. The magnetic field strength required can be determined by multiplying the value of the maximum beta energy of the sample in units of keV by 6.75, adding 1380 and dividing the sum by the distance in centimeters of the sample to the alpha spectrometer detector.

DETAILED DESCRIPTION OF THE INVENTION

Figure 1:
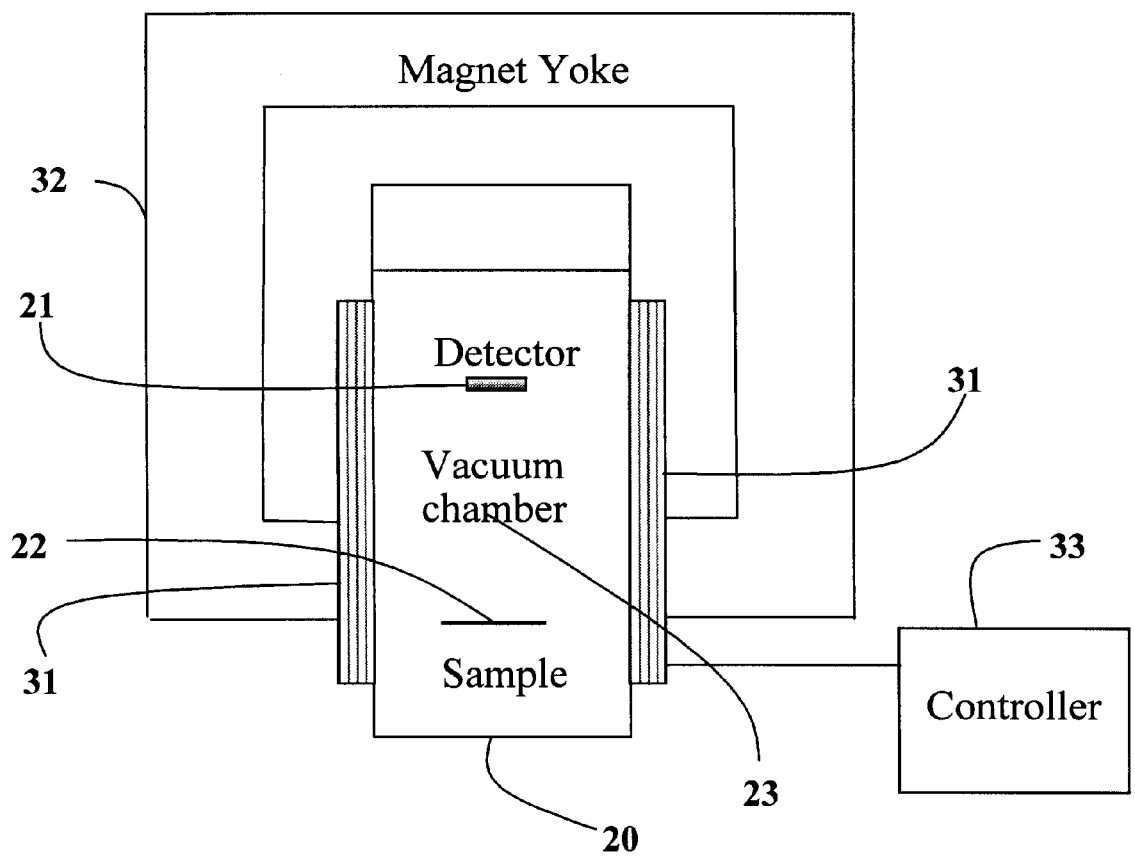
FIG. 1 is a schematic of the apparatus of the present invention.

The present invention comprises an apparatus and method for the detection of alpha particles and more particularly to the detection of very low concentrations of alpha particles in the presence of other ionizing radiation. Alpha spectrometers are commercially available that can detect alpha particles in a field of beta radiation at concentrations down to approximately $10^{-6}$. However, some process operations require detection of alpha particles at much lower concentrations.

An alpha particle is a doubly charged helium ion, composed of two protons and two neutrons. The alpha particle is the most massive of the common radiation particles, therefore carrying more energy and doing more damage. However, because of its mass and positive charge it has a very short range of less than a few centimeters in air. A sheet of paper effectively blocks these particles, and even the most energetic alpha particle generally cannot penetrate the dead cells covering the skin. Alpha particles become a danger when allowed to enter the body through inhalation or other sources, such as ingested medical isotopes, including Tc-99, a decay product of Mo-99.

A beta particle is essentially a high-speed electron emitted from the nucleus of the atom. These particles have a single negative charge and weigh only a small fraction of an alpha particle. As a result, they interact less readily with material and have a longer range. Depending on their energy, beta particles can travel from between 6 millimeters to 7 meters. Beta particles can penetrate the skin and damage the tissue underneath.

The apparatus and method according to the present invention takes advantage of the physical nature of radiation, rather than manipulating it chemically to separate and isolate one radioactive component from others in the sample. Alpha particles are separated from the beta particles in a sample using a magnetic field, taking advantage of the different mass values of the different types of radioactive particles to deflect the smaller-mass beta particles away from the detector, so that the detector can accurately detect very low quantities of alpha radiation.

The magnetic field influences charged particles and curves their trajectories. The force a magnetic field places on a charged particle is directly proportional to the strength of the magnetic field and the initial velocity of the incoming particle. The amount in which the particle is deflected is determined by its mass and velocity; heavier particles, or particles of high energy, are deflected less. The ratio of acceleration for a beta ($\beta$) particle with kinetic energy of 1 MeV compared to a 5 MeV alpha ($\alpha$) particle is 6.6 E4. This indicates that a $\beta$ particle, with its very small mass, is accelerated about 66,000 times more than an alpha particle, even though the alpha particle has more initial energy.

A standard alpha spectrometer generally consists of a vacuum chamber in which is placed the sample to be examined, i.e., the alpha source, a surface barrier detector, a bias supply, a preamplifier/amplifier, pulser, discriminator, scaler and digital display. The detector is generally n-type silicon with a chemically oxidized top surface to which a potential is applied. The detector is best suited to the detection of heavy charged particles, such as alpha particles, but can be rendered insensitive to alpha particles in the presence of high beta radiation activity.

According to the present invention, the apparatus consists of an alpha spectrometer, means for generating a uniform magnetic field around the alpha spectrometer, and means for controlling the magnetic field strength. Preferably, the means for generating the uniform magnetic field is a Helmholtz coil, which is a device used for providing a relatively uniform magnetic field, consisting of two circular coils on a common axis, connected in series and separated approximately by the radius of one of the coils. The Helmoltz coil functions as electromagnets designed to generate a field perpendicular to the path of the radiation. The strength of the magnetic field can be adjusted to selectively deflect beta particles from the sample of varying energy away from the alpha spectrometer detector. For example, a small field deflects low energy beta particles while allowing the high-energy betas and alphas to reach the detector. This permits the detector to identify high-energy betas without interference from the much more intense low energy beta radiation. A higher magnetic field deflects all the betas and only the alpha particles reach the detector allowing an accurate determination of the alpha radiation.

Referring to FIG. 1, the apparatus according to the present invention, an alpha spectroscopy system 10 for detecting alpha particles from a source with an alpha to beta particle activity ratio much less than $10^{-6}$, is shown. The apparatus includes the alpha spectrometer 20 wherein the detector 21 is some distance from the sample 22 inside of a vacuum chamber 23. According to the present invention, a Helmholtz coil 31, capable of generating a magnetic field inside of the vacuum chamber 23, is placed on each side of the alpha spectrometer 20. The Helmholtz coil 31 is connected to a magnet yoke 32, preferably made of iron, which largely constrains the magnetic field to the area around the alpha spectrometer 20, the vacuum chamber 23 and the sample 22. A means for controlling the field strength 33, such as a computer or other standard electrical controller, is connected to the Helmholtz coil to control the magnetic field strength produced.

In the method of the present invention, a sample is placed in the alpha spectrometer at a distance away from the detector. The sample may be derived from a non-liquid source, such as an air filter that can be directly placed inside the chamber or be derived from a liquid source, such as an aqueous liquid. If the sample is derived from a liquid, the liquid source, or an aliquot of the liquid source, is first dried, preferably on a stainless steel disk, to evaporate the liquid to leave the radiation-emitting sample. That sample is then placed in the alpha spectrometer vacuum chamber. The strength of the magnetic field is set to a value sufficient to deflect the beta particles and allow detection of the alpha contamination in the sample.

Figure 2:
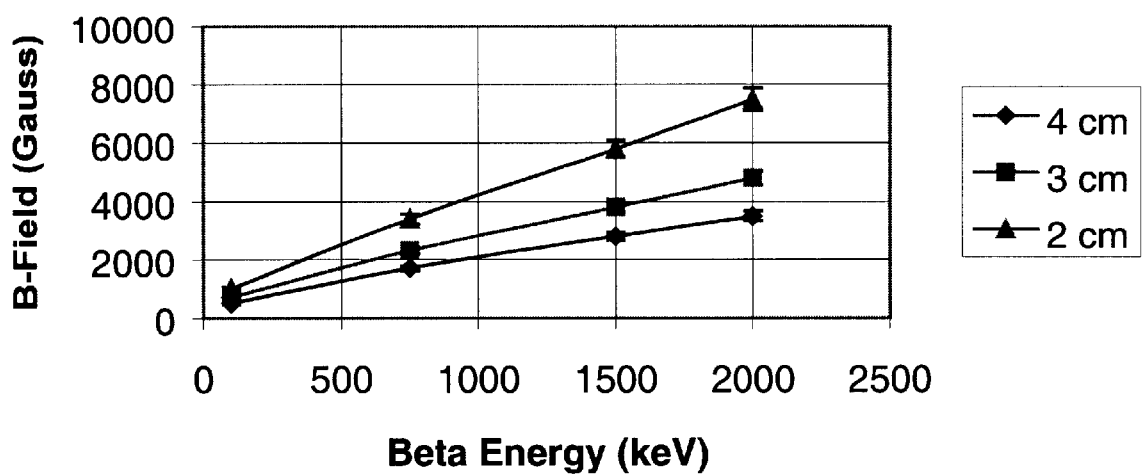
FIG. 2 shows the strength of magnetic field required to deflect the beta particles.

The strength of the field required depends both on the distance of the sample to the detector in the alpha spectrometer and the nature of the source of radiation. FIG. 2 shows the relationship between the magnetic field required to deflect essentially all of the beta particles and the distance of the sample to the detector and the maximum beta energy of the sample. As the sample is placed closer to the detector, the strength of the magnetic field required to deflect the beta particles to allow detection of the alpha particles increases. Also, the strength of the magnetic field required increases as the strength of the maximum beta energy of the sample increases. The relationship to determine the magnetic field strength required to adequately deflect the beta particles is given by Eq. 1:

$$B = (1380 + 6.75 \, E) \times 10^{-6} / D \tag{1}$$

where
B=magnetic field strength (tesla)
E=maximum beta energy of sample (keV)
D=distance of sample to detector (m)

The magnetic field can be adjusted according to this relationship to selectively allow only alpha particles to reach the detector. The field may also be manipulated to examine only the high-energy end of a beta spectrum. For the samples tested, the magnetic field strength required to deflect essentially all of the beta particles was greater than approximately 0.05 tesla and less than approximately 0.8 tesla. The entire process takes only a few hours to complete. There is virtually no waste generated and the labor is minimal.

EXAMPLE 1

Sample Containing Th-228

A mixed alpha source was investigated using the apparatus of the present invention. The test sample consisted of an electroplated Th-228 source. The sample was placed inside the chamber at a distance of 4 cm from the detector and counted at varying magnetic fields. The shape of the alpha spectra remained the same at different magnetic field strengths because the alpha particles are not deflected significantly. However, at high magnetic fields the peaks of the spectra are shifted to a lower energy.

Figure 3:
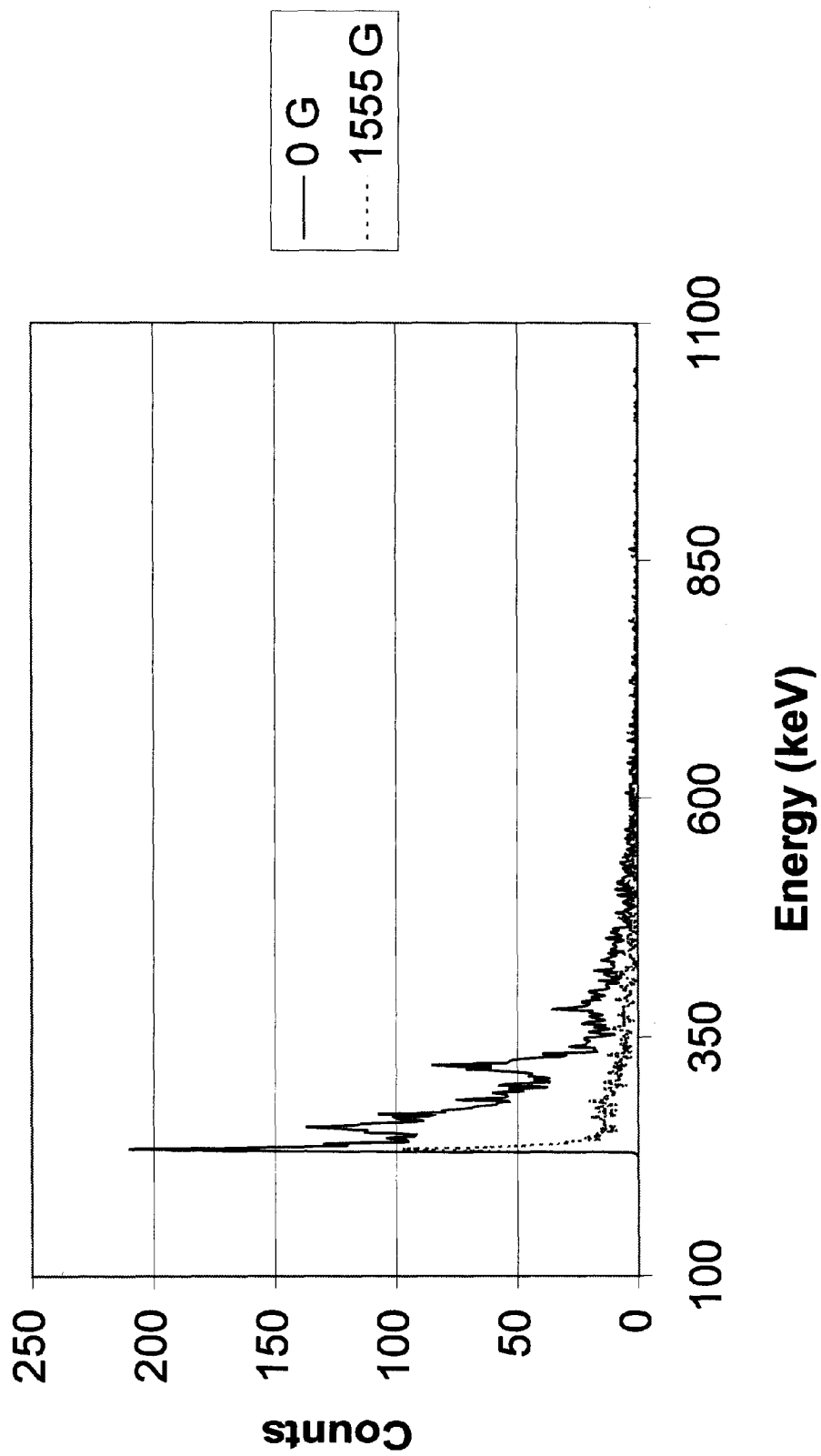
FIG. 3 shows the beta spectra for thorium-228.

The maximum beta energy in the Th-228 chain is approximately 2260 keV, as shown in FIG. 3. According to Eq. 1, a magnetic field strength of approximately 0.4160 tesla is thus needed to deflect essentially all of the beta particles from reaching the detector. Due to experimental considerations, a field strength of 0.1555 tesla was used. Analysis of the beta spectra at 0.1555 tesla confirms particle deflection. Under a magnetic field strength of 0.1555 tesla, the low energy ends of the spectra shown in FIG. 3 begin to disappear, indicating that essentially no β particles reach the detector. This graph reveals the significant drop in the number of low energy beta particles being detected under a magnetic field of 0.1555 tesla. A magnetic field strength of 0.4160 tesla would therefore even be more effective in deflecting the beta particles.

Figure 4:
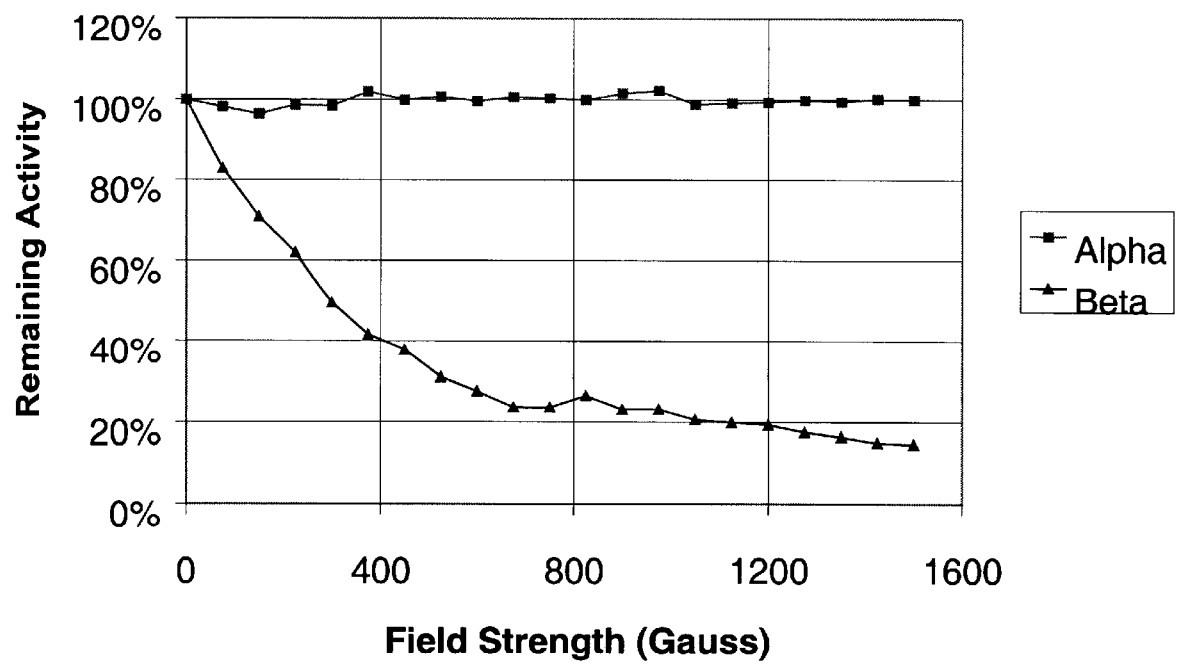
FIG. 4 shows the alpha and beta activity reaching the detector as a function of field strength for thorium-228.
Figure 5:
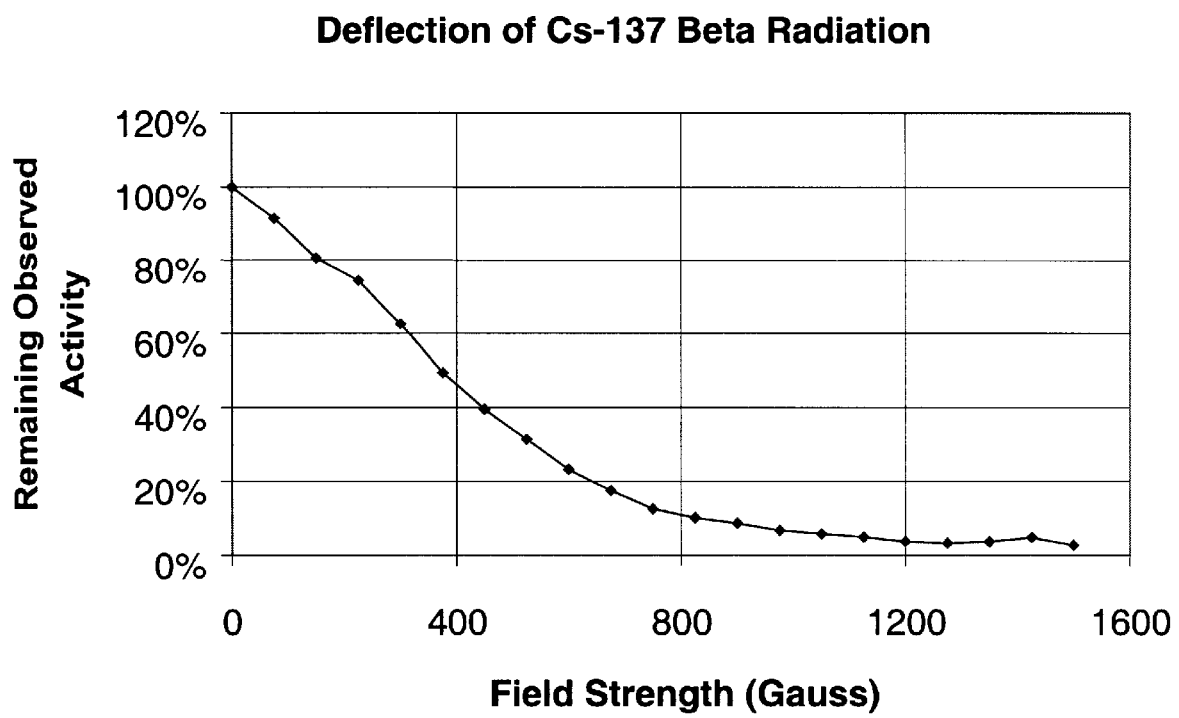
FIG. 5 shows the beta activity reaching the detector as a function of field strength for cesium-137.

Analysis of the total counts measured also confirms β deflection, as shown in FIG. 4. The number of alpha counts remains fairly constant with increasing magnetic fields, at about 10,000 counts. The beta count, however, drops significantly as the magnetic field strength is increased.

EXAMPLE 2

Sample Containing Cs-137

A sample containing Cs-137 was investigated using the apparatus of the present invention. A liquid sample containing the source was prepared by taking an aliquot and evaporating the sample onto a stainless steel disk. The sample was placed 4 cm (0.04 m) from the detector in the apparatus. The maximum beta energy of Cs-137 is approximately 1170 keV. The magnetic field strength required to deflect the beta particles was therefore determined to be approximately 0.2320 tesla. FIG. 6 shows the percentage of beta radiation remaining as a function of magnetic field strength. The results show that at a field strength of 0.15 tesla, essentially all of the beta particles have been deflected and do not reach the detector.

The invention being thus described, it will be apparent to those skilled in the art that the same may be varied in many ways. Such variations are not to be regarded as a departure from the spirit and scope of the invention, and all such modifications are intended to be included within the scope of the following claims.

We claim:

1. An apparatus for detecting alpha particles in the presence of beta particles, comprising:

an alpha spectrometer, comprising a vacuum chamber in which a sample is placed, a detector, a bias supply, a preamplifier/amplifier, a pulser, a discriminator, a scaler and a display, said sample a source of alpha particles with a ratio of alpha activity to beta activity less than approximately $1 \times 10^{-6}$;

a Helmholtz coil for generating a magnetic field within the vacuum chamber of the alpha spectrometer;

a magnet yoke to constrain the magnetic field, said magnet yoke consisting essentially of iron; and means for controlling the strength of the generated magnetic field.

2. The apparatus of claim 1 wherein the sample is placed between 2 and 4 centimeters from the detector.

3. A method for detecting alpha particles in the presence of beta particles, comprising:

placing a sample in an alpha spectrometer;

applying a magnetic field around the alpha spectrometer to yield a magnetic field strength B, said magnet field produced by Helmholtz coils surrounding the alpha spectrometer and constrained by an iron magnet yoke, and said magnetic field strength B determined by $B = (1380 + 6.75\ E) \times 10^{-6}/D$, where B is the magnetic field strength in tesla, E is the maximum beta energy of the sample in units of keV, and D is the distance in meters of the sample to the alpha spectrometer detector; and detecting alpha particles from the sample.

4. The method of claim 3 wherein the magnetic field strength is at least 0.05 tesla.

5. The method of claim 4 wherein the magnetic field strength is less than 0.8 tesla.

6. The method of claim 3 wherein the sample is a source of alpha particles with a ratio of alpha activity to beta activity less than approximately $1 \times 10^{-6}$.

* * * * *